United States Patent [19]

Hsu

[11] Patent Number: 5,040,582

[45] Date of Patent: Aug. 20, 1991

[54] MULTI SPECIES LAMINATED VENEER LUMBER

[75] Inventor: W. Ernest Hsu, Orleans, Canada

[73] Assignee: Forintek Canada Corp., Ottawa, Canada

[21] Appl. No.: 542,000

[22] Filed: Jun. 22, 1990

[51] Int. Cl.⁵ .............................................. B27D 1/00
[52] U.S. Cl. .................................. 144/348; 144/346; 144/352; 156/255; 156/264
[58] Field of Search ............... 156/163, 164, 255, 256, 156/260, 264, 299; 144/345, 346, 348, 352, 367, 365; 427/440, 441

[56] References Cited

U.S. PATENT DOCUMENTS

| | | | |
|---|---|---|---|
| 671,467 | 4/1901 | Brown | 144/346 |
| 1,734,272 | 11/1929 | Pointer | 144/348 |
| 2,245,170 | 6/1941 | Ende et al. | 144/348 |
| 3,205,111 | 9/1965 | Williamson et al. | 144/348 |
| 4,361,458 | 11/1982 | Grajek et al. | 144/346 |

Primary Examiner—W. Donald Bray
Attorney, Agent, or Firm—Stanley E. Johnson

[57] ABSTRACT

A method of producing laminated veneer lumber (LVL) with good dimensional stability, characterized by a particular lay-up of the veneers and the veneers being of at least two different wood species. The particular veneer lay-up and species arrangement, minimizes the tendency of warping and cracking of the LVL. All veneers are laid-up in pairs by species with the loose sides of each pair contacting each other and with the species pair sequence from face to core being identical on either side of the center ply or center line. The veneer tight faces of different species are bonded to one another. The dimensional stability of the LVL is optionally enhanced by a water repellent, flow promoter and bulking agent that is incorporated into the adhesive before application onto the veneer. The different species veneers are dried to different moisture contents before lay-up with the denser species being of lower moisture content than the less dense species.

16 Claims, 2 Drawing Sheets

MULTI SPECIES LAMINATED VENEER LUMBER

FIELD OF INVENTION

This invention relates to laminated veneer lumber and more particularly to a particular lay-up of the veneers and where the veneers are from at least two different wood species and where there is a particular arrangement of those species.

BACKGROUND OF INVENTION

Laminated veneer lumber (LVL) is composed of layers or plies of wood veneer bonded one veneer layer to the next by an adhesive and with the grain direction of all veneer plies parallel to one another. Normally, LVL has higher stress design values than solid wood for structural applications.

While veneers can be made by either a slicing or a rotary peeling operation, nearly 95% of all veneers produced in the world today are rotary peeled because of higher production efficiency. All known commercial LVL's for structural applications are produced from rotary peeled veneers.

Laminated veneer lumber made from softwoods is well documented in the prior art. In 1944, R. F. Luxford showed that Sitka Spruce laminated veneer products had strength properties equal to solid wood material. Reference may be had to an article entitled "Strength of Glued Laminated Sitka Spruce Made Up of Rotary Cut Veneers", U.S. department Agri Forest Service FPL 1512 Forest Prod Lab, Madison Wis. MICRO=LAM* lumber, a laminated veneer lumber was developed by Trus Joist Corporation and introduced to the construction industry in 1971 in the U.S.A. LVL has been made from rotary-peeled Douglas-fir veneers and more recently from Southern yellow pine veneers. A laminated veneer lumber (LVL) made from spruce veneer and known in the trade as Master Plank* was sold by Gang-Nail Systems Inc. in the U.S. and more recently are selling LVL known as Gang-Lam made from Southern Yellow Pine veneers. A Spruce laminated veneer lumber (LVL) has been produced in Finland since 1981 and known in the trade under the name Kertopuu. All of these LVL's are made from softwoods, i.e., Spruce, Pine or Douglas Fir.

Patents relating to LVL that have issued, are by way of example, U.S. Pat. No. 4,608,106 issued Aug. 26, 1986 to P. K. Lahtinen U.S. Pat. No. 3,908,725 issued Sept. 30, 1975 to P. Koch and U.S. Pat. No. 3,580,760 issued May 25, 1971 to P. Koch.

None of the prior art teaches using veneers of different wood species or how the veneer layers should be laid up relative to one another to make LVL from mixed wood species. Furthermore, the known LVL is used exclusively for structural purposes.

In using rotary peeled veneer and/or different species there are potential problems that must be considered. For example, warping and cracking can occur due to differential shrinkage and expansion between different species.

With respect to rotary peeling a log, the veneer is unwound in a long continuous ribbon at a pre-set thickness. As a result, the direction perpendicular to the grain direction and thickness direction of a veneer is the tangential direction to the annual rings, the thickness direction of a veneer is the radial direction to the annual rings and the direction along the wood grain direction is the longitudinal direction of a veneer. For simplicity these are defined as tangential (or width) direction, radial (or thickness) direction and longitudinal (or length) direction, respectively. It is a fact that the dimensional change of a veneer is the greatest in the tangential direction. Therefore, the dimensional changes in the width (tangential) direction of LVL could be noticeable and affect the integrity of the structural system when the LVL is subjected to severe moisture changes.

Lathe checks are inevitable in every laid out, flat, rotary-peeled veneer. The fractures that develop in the veneer are due to the severe veneer bending required following the cutting action of the knife during rotary peeling to provide a flat sheet. This bending of the veneer during peeling is against the natural curve of the veneer.

In view of the above facts, LVL can have large dimensional changes in its width direction and cracks from the propagation of lathe checks in the veneer when it is subjected to even minor moisture changes. To develop sufficient adhesion between veneers, a veneer densification inevitably occurs and some internal stresses develop within the LVL and thus the thickness swelling of LVL becomes a concern when it is exposed to water or high humidity environment. Consequently, it is desirable to improve the dimensional stability and durability of LVL.

As indicated hereinbefore, LVL's are either produced from a single species (e.g. Douglas Fir or Spruce) or from the same group of species (e.g. Southern Yellow Pines, e.g., long leaf pine, short leaf pine). Also, currently all LVL is for structural applications and is exclusively made from softwoods. However, many hardwoods are superior to softwoods in terms of strength, toughness, hardness and abrasion resistance, and thus superior LVL could be produced from many hardwoods. Unfortunately, it is difficult to economically obtain large quantities of single species hardwood veneers for a LVL plant.

Mixed species forest stands are common in many regions of the world. Normally, only one or two species are desirable for sawmills or plywood mills and a lot of trees are left as residues after harvesting. It is costly to clear the forest sites after the primary species of trees are harvested. It is also a great waste from the viewpoint of resource utilization. High quality hardwood veneers are highly desirable in furniture and cabinet industries but lower grades of hardwood veneers have very few market niches. This provides a great pressure on the hardwood veneer producers. These under-utilized grades of hardwood veneers can be made (with other species of veneers) into LVL for structural and nonstructural applications in accordance with the present invention.

SUMMARY OF INVENTION

A primary object of this invention is to provide a method for producing LVL from at least two different species and the product so produced.

Another object of the present invention is to improve the stability of the LVL made from mixed wood species.

A still further object of the present invention is to minimize the stresses between veneer layers of different species. The main concern for making a LVL from mixed wood species is the difference in shrinkage and expansion between the different wood species and particularly the difference between high and low density wood species. The shrinkages and expansions of wood are greatly affected by species and wood densities. In general, they are increased with increasing wood density. When different species of veneers are bonded together, they shrink and expand with different magnitudes and rates under moisture changes. The LVL tends to warp if the species are not arranged to balance each other. The lathe check tends to propagate and crack after the LVL is subjected to moisture changes. If the conventional procedures of making LVL are employed, warp and crack will be more pronounced for the LVL made from mixed species than that made from a single species.

The foregoing concerns of using mixed species are addressed by this invention.

In accordance with this invention, all veneers are laid-up in pairs by species with the loose faces (the faces with lathe checks) in each pair facing each other. This allows each pair of veneers to act as a single thick veneer and thus, the loose face of one species veneer will not be bonded to the tight face of another species veneer. By way of brief explanation, when a veneer is peeled from a log, its opposite faces go through different arcs of curvature during bending to a flat sheet. The face immediately being formed by the peeling knife undergoes the greatest change and is effectively stretched hence the "loose face" and the opposite face is referred to as the tight face. This bending that takes place is against the natural curvature of the veneer. The cutting also causes checks in the same face.

Every two veneers of the same species of each pair have similar shrinkage and expansion characteristics. In addition, thicker veneers are stiffer and stronger than the thin veneers. Consequently, the potential of veneer cracking is minimized. If the loose face of one species of veneer is bonded to the tight face of another species veneer, the lathe checks will open after expansion and the checks will not return to their original position after subsequent shrinkage. The species sequence from face to core must be identical or very similar on either side of the center ply when an odd number of plies are used or the center line when an even number of plies are used. This balanced species arrangement with respect to the center ply or the center line in the LVL minimizes the tendency of warping.

In accordance with a further aspect of this invention, wax (natural or synthetic) may be used to reduce the internal stresses induced during hot pressing, to improve resin penetration into wood and lathe checks and to improve the water repellency of the LVL. A wax emulsion can be pre-mixed with a liquid resin and the mixed resin and wax can be applied to the veneer surfaces. During hot pressing, the wax penetrates into the wood acting as a bulking agent and promotes resin flow. Wax flows easily and reduces internal stresses during LVL consolidation. The wax selected must have a melting point well below the curing temperature of the adhesive and remain in the LVL after hot pressing.

In accordance with a specific embodiment of the invention, the veneer is treated with a softening and bulking agent such as polyethylene glycol-1000 which is a synthetic wax. This will reduce the development of internal stresses from hot pressing and improve the dimensional stability of LVL. The polyethylene glycol-1000 can be pre-mixed with adhesive or applied separately onto the veneer.

A further specific object of the present invention is to provide multi-ply LVL multi species panel. Uses for such panels are truck box beds, rail car floors and the like.

BRIEF DESCRIPTION OF THE DRAWINGS

The invention is illustrated by way of example in the accompanying drawings wherein.

DETAILED DESCRIPTION OF PREFERRED EMBODIMENTS

Figure 1:
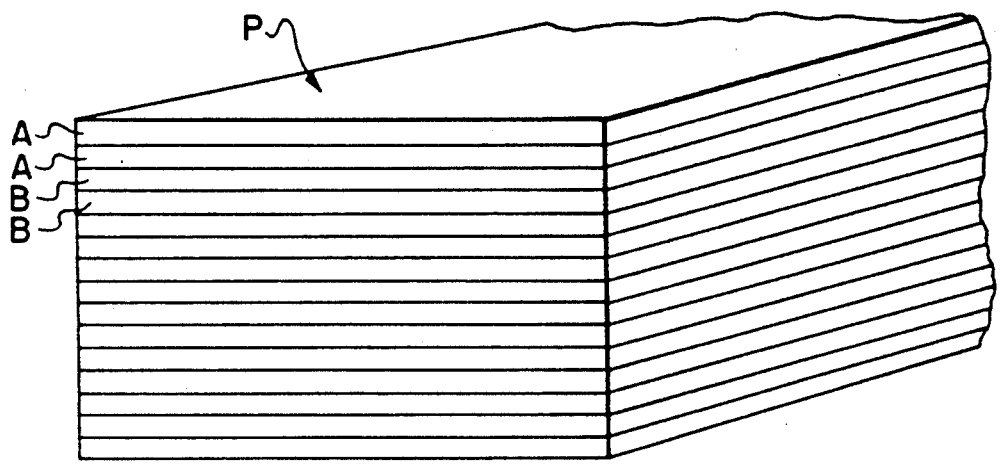
FIG. 1 is an oblique view of a piece of laminated veneer lumber provided in accordance with the present invention.
Figure 2:
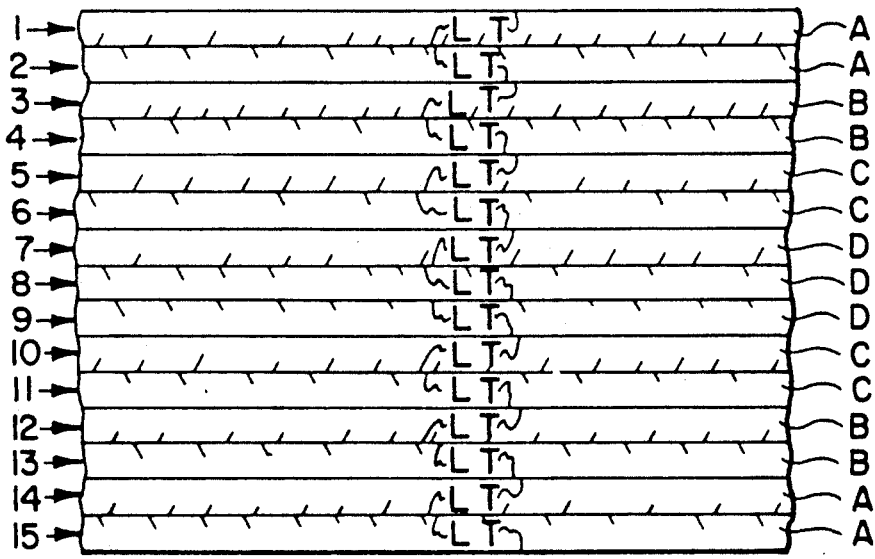
FIG. 2 is a side view portion of enlarged size compared to FIG. 1 of a 15-ply veneer lay-up representation as used in producing laminated veneer lumber from different wood species in accordance with the present invention.
Figure 3:
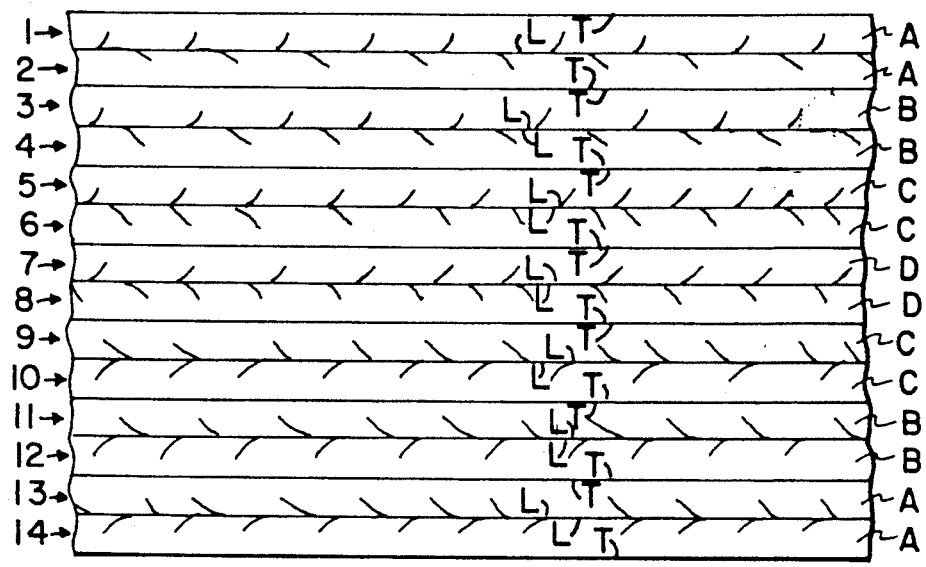
FIG. 3 is similar to FIG. 2 but where the veneer lay-up is 14-ply.
Figure 4:
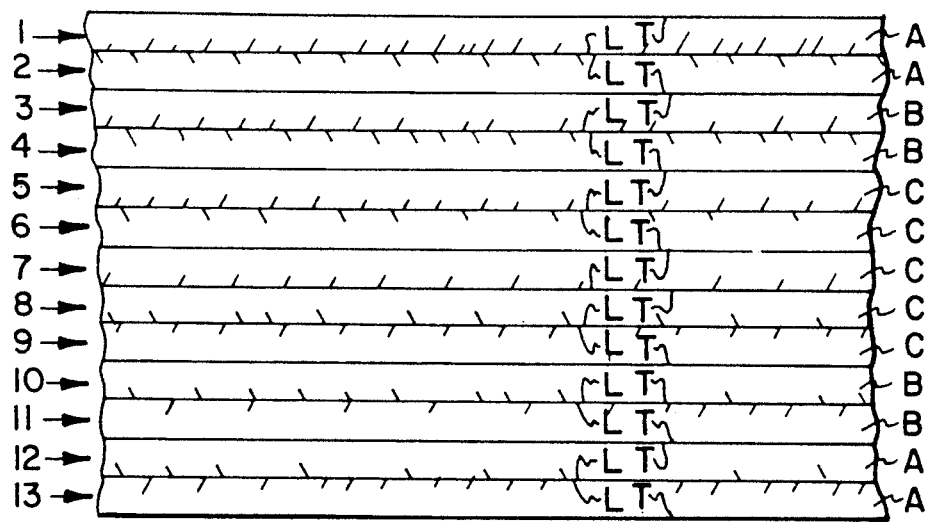
FIG. 4 is similar to FIG. 2 but where the veneer lay-up is 13-ply.

Illustrated in FIG. 1 is a piece of laminated veneer lumber cut from a panel of multi layers having a lay-up according to or similar to FIGS. 2, 3 or 4. The multi layer panel is formed by hot pressing in a conventional manner. After a panel has been formed (say one and a half inches thick) it is saw cut to provide pieces of LVL of sizes say 2"×4", 2"×6", 2"×8" and like as desired one such piece being shown in FIG. 1. Actually, most any size pieces can be made since known presses are used providing panels of up to four feet wide and in lengths that are convenient to handle which is normally 60 feet but they can be longer.

With reference to FIGS. 2 through 4, different wood species are arbitrarily designated by letters A, B, C and D. Each of the different wood species represents a resinated veneer ply, with the Letter L representing the loose face (with lathe checks) of a veneer and Letter T representing the tight face (without lathe checks) of a veneer.

Referring to FIG. 3 there is illustrated, in side view, veneer layers designated 1 to 14 where layers 1 and 2 are a pair of veneers each of wood species A, layers 3 and 4 a pair of veneers of wood species B, layers 5 and 6 a pair of veneers of wood species C and layers 7 and 8 is a pair of veneers of wood species D. The abutting faces of the veneers of layers 7 and 8 is the center line of the panel lay-up. Layers 9 and 10 are identical to layers 5 and 6 but on the opposite side of this center line. Similarly, layers 11 and 12 are identical with layers 3 and 4 and layers 13 and 14 are identical with layers 1 and 2 but on the opposite side of the center line. Within the boundry of each layer are the letters L and T indicating respectively the loose and tight face for the veneers.

FIGS. 3 and 4 are the same as FIG. 3 except there are the 15 layers in FIG. 2 and 13 layers in FIG. 4.

In the 15 layer lay-up in FIG. 2, layer 8 is the center layer and is of the same wood species as the layers 7 and 9 in face-to-face abutting relation therewith. The abutting faces of layers 8 and 9 are respective tight to loose faces which is the only instance of bonding them together. There is, however, minimum consequences from this because of being at the core of the lay-up and because all three layers 7, 8 and 9 are of the same species.

The 13 layer lay-up of FIG. 4 is essentially the same as FIG. 2 in that layers 7 and 8 have their respective loose and tight faces bonded together In the FIG. 4 embodiment there are only three wood species, namely A, B and C. There could be only two if so desired.

In the foregoing species A, by way of example, may be high density hardwoods such as White Birch, Yellow Birch, Maple, Beech, Red and White Oak, species B low density hardwoods such as Aspen and Poplar, species C and D softwoods such as Spruce, Pine, Fir.

To make panels for producing LVL, veneers of selected wood species A, B, C and D are laid-up in layer pairs in assembly or directly in a press for hot press forming laminated veneer panels and the species pairs sequence from face to core are symmetrical. In FIGS. 2 and 4 the species pairs are identical on both sides of center ply (layers 8 and 7 respectively in FIGS. 1 and 3) and in FIG. 2 they are identical on both sides of the center line (junction of layers 7 and 8). Species A, B, C and D are species (if desired the same species) as long as the species pairs are symmetrical with respect to the center ply or center line. The same letter represents the same wood species or different species with very similar physical and mechanical properties. Ideally, the loose side of one species of veneer is never laid-up to bond to the tight side of another species of veneer. Also preferably in the same species the bonding always is loose to loose and tight to tight. In all of the figures the outer exposed face of the LVL is the tight face of the veneer layer. Layers 1 and 2, of the same species are bonded loose to loose and layers 2 and 3 of different species A and B are bonded tight to tight.

To reduce the stresses between the veneer layers of different species after hot pressing, higher shrinkage species veneer (normally denser veneer) are dried to a moisture content slightly lower than the lower shrinkage species veneer.

In accordance with another aspect of this invention, the veneer moisture content must be well controlled for LVL production to minimize the stresses between different species after hot pressing. The veneer moisture content of denser species should be lower than that of less dense species because denser species have a generally higher shrinkage than the less dense species. For example, if the tangential shrinkage of "A" species is 1% higher than "B" species, the veneer moisture content of "A" species should be 2% to 3% lower than that of "B" species.

To improve the dimensional stability of laminated veneer lumber, the resin used to bond veneers together can be modified with an additive or additives which serve as a water repellent, flow promoter and bulking agent such as natural wax emulsions or synthetic such as polyethylene glycol solutions. The polyethylene glycol water repellent, flow promoter and bulking agent is a solution of polyethylene glycol having a molecular weight less than 2000.

It is also understood that veneer end joints must be used to manufacture laminated veneer lumbers longer than the length of veneer.

It will be apparent to one skilled in the art that alterations can be made to the number of veneer plies from that shown in FIGS. 1 to 3 but is important that all veneers be laid-up in pairs by species with the loose sides of each pair facing one another, and having the species pair sequence from face to core identical (or almost so) on opposite sides of the center ply, or center line as the case may be dependent upon the number of layers. The different wood species may be hardwoods or softwoods or any combination and subcombination of hardwoods and softwoods.

Panels of the foregoing lay-up not only provide pieces of LVL of superior quality for structural uses which can be served by softwood LVL but also large panels of the same are suitable for structural purposes which cannot be served by softwood LVL. For example, panels may be used for the bed of truck boxes because of the superior quality that results from using multi species. The panels for example have a hard outer face (of hardwood) and somewhat resilient inner core layers of softwood.

I claim:

1. In the manufacture of laminated veneer lumber wherein each veneer sheet is made by rotary peeling a log and as a result thereof has a tight face and a loose face and wherein the veneers are stacked face-to-face in a lay-up and including an adhesive between adjacent layers to form a multi layer panel by hot pressing, said panel being cut to provide pieces of laminated veneer lumber, an improved lay-up comprising, placing opposite respective loose and tight faces of the veneer layers in face-to-face relation with the respective loose and tight faces of the next adjacent layer, in substantially all of the layers in the lay-up, using veneers of at least two different wood species, arranging the layers of the different wood species, arranging the layers of the different wood species symmetrically about the central core portion of the complete laid-up panel and arranging the adjacent layers of the different wood species with their tight faces in face-to-face relation.

2. An improvement as defined in claim 1 wherein the veneer layers of the same wood species are arranged in pairs.

3. The improvement as defined in claim 1 including premixing a combined water repellent, flow promoter and bulking agent with an adhesive prior to applying the adhesive to the respective veneer layers.

4. Improvement as defined in claim 3 wherein said water repellent, flow promoter and bulking agent is an emulsion wax having a melting point lower than the curing temperature of the adhesive during hot pressing.

5. Improvement as defined in claim 4 wherein said water repellent, flow promoter and bulking agent is a solution of polyethylene glycol having a molecular weight less than 2000.

6. In the manufacture of laminated veneer lumber wherein each veneer sheet is made by rotary peeling a log and as a result thereof has a tight face and a loose face and wherein the veneers are stacked face-to-face in a lay-up and including an adhesive between adjacent layers to form a multi layer panel by hot pressing, said panel being cut to provide pieces of laminated veneer lumber, an improved lay-up comprising arranging the veneer layers in pairs and with the loose faces in each pair in face-to-face relation, disposing the tight faces of adjacent pair of layers in face-to-face relation, using veneers of at least two different wood species with each pair of layers being of the same wood species and arranging the layers of the different wood species symmetrically about the central core portion of the complete laid-up panel.

7. The improvement as defined in claim 1 wherein said different wood species are selected from softwoods and hardwoods.

8. The improvement as defined in claim 7 wherein the tight faces of the softwood veneers are bonded to the tight faces of hardwood veneers in the next adjacent layers.

9. The improvement as defined in claim 7 wherein said softwoods are selected from Spruce, Pine and Fir and said hardwoods are selected from Birch, Maple, Beech, Oak, Aspen and Poplar.

10. The improvement as defined in claim 1 including drying the veneers of different wood species to selected moisture contents dependent upon the wood species with the higher density species having a lower moisture content than the lower density wood species.

11. The improvement as defined in claim 10 wherein outer layers of the lay-up are high density hardwood veneer layers, wherein the inner most layers are softwood veneer layers and wherein the layers therebetween are low density hardwood veneers.

12. In the manufacture of laminated veneer lumber wherein each veneer sheet is made by rotary peeling a log and as a result thereof has a tight face and a loose face and wherein the veneers are stacked face-to-face in a lay-up to form a multi layer panel by hot pressing from which pieces of laminated veneer lumber are cut, an improved lay-up comprising placing opposite respective loose and tight faces of the veneer layers in face-to-face relation with the respective loose and tight faces of the next adjacent layer in substantially all of the layers in the lay-up, and arranging the layers symmetrically about the central core portion of the complete laid up panel.

13. An improvement as defined in claim 12 wherein the veneers are selected from softwoods and hardwoods, wherein the layers of the same wood species are arranged in pairs and wherein the tight faces of the softwood veneers are bonded to the tight faces of the hardwood veneers in the next adjacent layers.

14. The improvement as defined in claim 13 including drying the higher density veneers to a lower moisture content than the softer wood veneers.

15. Laminated veneer lumber of multi wood species having a layer lay-up as defined in claim 1.

16. Laminated veneer lumber panels for nonstructural purposes having a lay-up as defined in claim 12.

* * * * *